United States Patent
Moorti et al.

(10) Patent No.: US 7,924,764 B2
(45) Date of Patent: Apr. 12, 2011

(54) METHOD AND APPARATUS FOR PACKET PROCESSING

(75) Inventors: Rajendra Tushar Moorti, Mountain View, CA (US); Rohit V. Gaikwad, San Diego, CA (US); Amit G. Bagchi, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 683 days.

(21) Appl. No.: 11/301,522

(22) Filed: Dec. 13, 2005

(65) Prior Publication Data

US 2007/0058623 A1    Mar. 15, 2007

Related U.S. Application Data

(60) Provisional application No. 60/703,141, filed on Jul. 28, 2005.

(51) Int. Cl.
*H04B 7/204*   (2006.01)
*H04L 12/28*   (2006.01)
*H04L 12/413*  (2006.01)
*H04J 3/16*    (2006.01)

(52) U.S. Cl. ......... 370/319; 370/392; 370/445; 370/466

(58) Field of Classification Search .................... 370/445
See application file for complete search history.

(56) References Cited

U.S. PATENT DOCUMENTS

| | | | |
|---|---|---|---|
| 6,671,525 B2 * | 12/2003 | Allen et al. | 455/574 |
| 7,110,350 B2 * | 9/2006 | Li et al. | 370/204 |
| 7,161,955 B1 * | 1/2007 | Zeng et al. | 370/466 |
| 7,218,628 B2 * | 5/2007 | Chiu et al. | 370/349 |
| 2005/0135295 A1 * | 6/2005 | Walton et al. | 370/328 |
| 2006/0109809 A1 * | 5/2006 | Kao et al. | 370/328 |

FOREIGN PATENT DOCUMENTS

EP    1519518 A2 *   3/2005

\* cited by examiner

*Primary Examiner* — Chirag G Shah
*Assistant Examiner* — Cassandra Decker
(74) *Attorney, Agent, or Firm* — Garlick Harrison & Markison; Kevin L. Smith

(57) ABSTRACT

Frame processing for a wireless communication system. The frame processing includes detecting reception of a frame based on a portion of a preamble of a frame, wherein the frame includes a preamble and a data payload. With detecting the reception of a frame, determining a frame type of a plurality of frame types from at least the portion of the preamble. Processing a remaining portion of the preamble in accordance with the frame type to determine payload processing parameters, and processing the data payload based on the payload processing parameters.

16 Claims, 7 Drawing Sheets digital receiver processing module 64 packet protocol control state machine 500 packet protocol control state machine 500

METHOD AND APPARATUS FOR PACKET PROCESSING

CROSS REFERENCE TO RELATED APPLICATION

This application claims priority to U.S. Provisional Application Ser. No. 60/703,141 filed Jul. 28, 2005, which is hereby incorporated herein by reference in its entirety for all purposes.

BACKGROUND

1. Technical Field

This invention relates generally to wireless communications and more particularly to multiple protocol wireless communication baseband transceivers.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital amps, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency (RF) carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

For each wireless communication device to participate in wireless communications, it includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-input-single-output (SISO) communication, even if the receiver includes multiple antennas that are used as diversity antennas (that is, selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (for example, low noise amplifier (LNA), down conversion module, filters, and analog-to-digital converters). Each of the receiver paths processes the received RF signals to produce digital signals, which are combined and then processed to recapture the transmitted data.

For a multiple-input-single-output (MISO) wireless communication, the transmitter includes two or more transmission paths (for example, digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (SISO, MISO, SIMO, and MIMO) and standards (for example, IEEE 802.11, IEEE 802.11a, IEEE 802.11b, IEEE 802.11g, IEEE 802.11n, extensions and modifications thereof), a large number of combination of types and frame formats is possible. For a manufacturer of radio frequency transceiver integrated circuits (ICs) to provide ICs for a majority of the combination of standards specifications and types, the manufacturer must produce a significant number of ICs to accommodate each variation, which is a costly endeavor.

Therefore, a need exists for receiver packet processing that is capable of processing the multitude of extant frame formats and the associated data payloads, while also providing flexibility to accommodate subsequent extensions and modifications of standards specifications when embodied in an integrated circuit(s).

SUMMARY

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
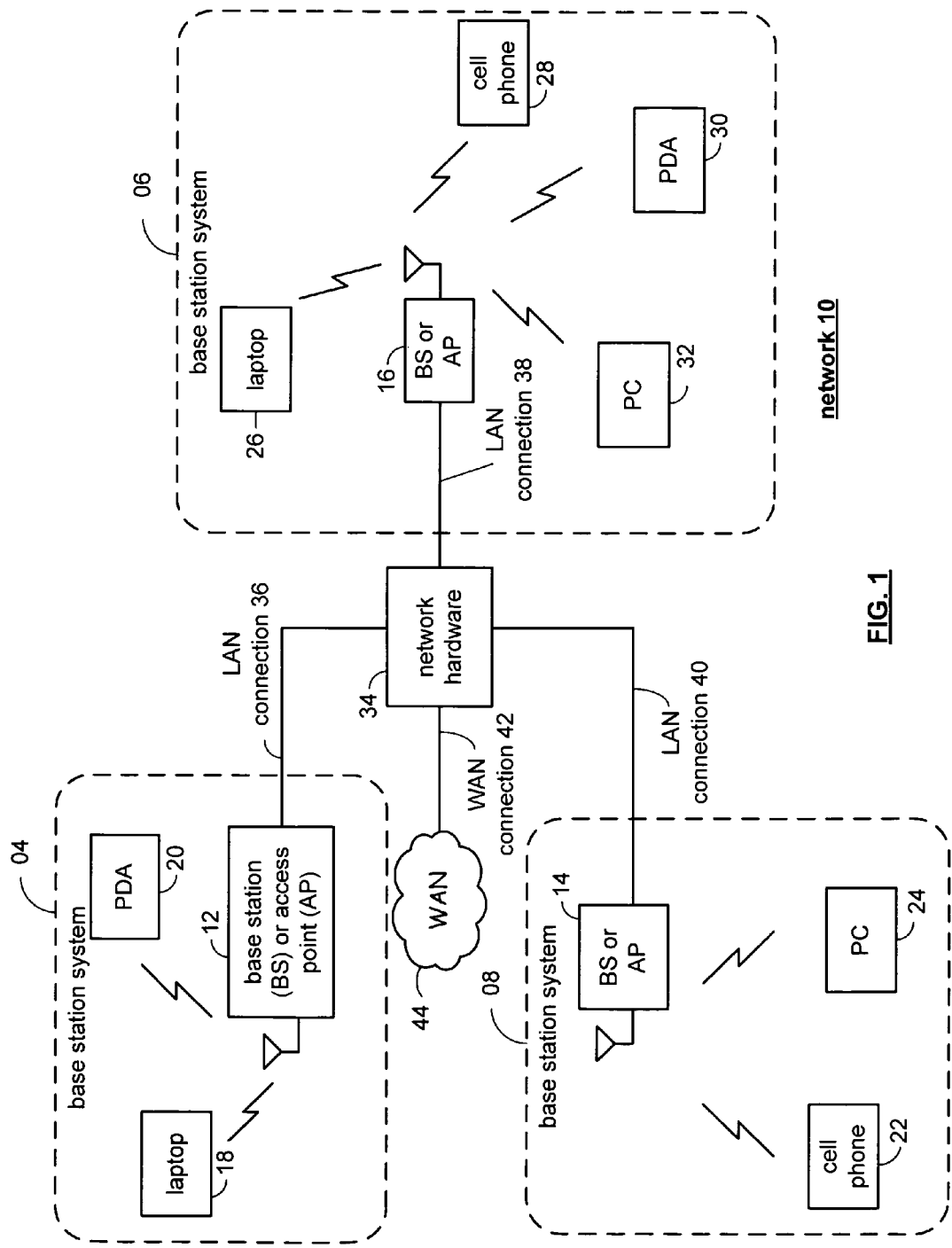
FIG. 1 is a functional block diagram illustrating a communication system that includes a plurality of base stations or access points (APs), a plurality of wireless communication devices and a network hardware component in accordance with the present invention.

FIG. 1 is a functional block diagram illustrating a communication system that includes circuit devices and network elements and operation thereof according to one embodiment of the invention. More specifically; a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-10.

The base stations or access points 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10 to an external network element. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
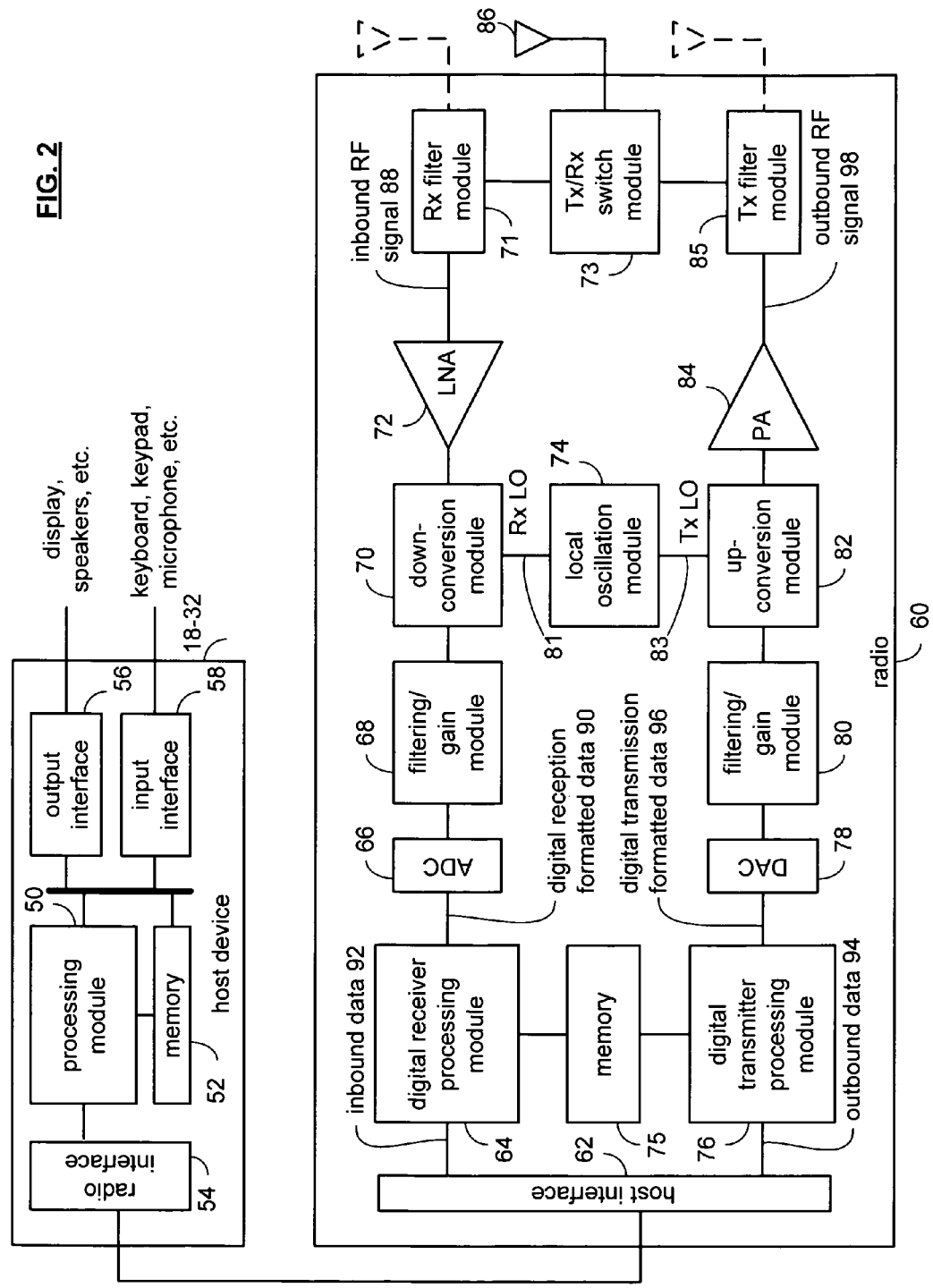
FIG. 2 is a schematic block diagram illustrating a radio frequency (RF) transmitter architecture including a baseband processor and a radio processor in accordance with the present invention.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (for example, IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
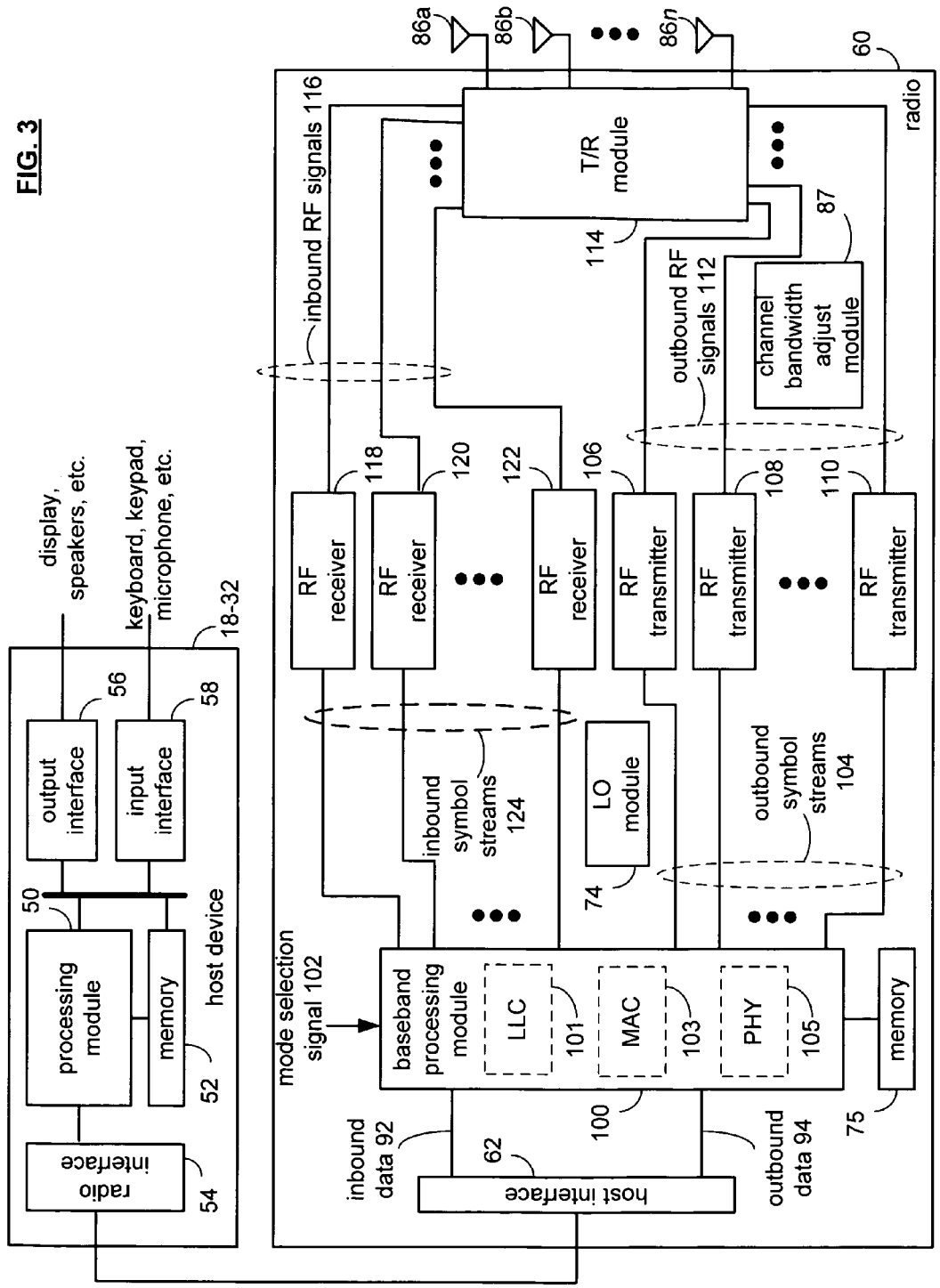
FIG. 3 is a schematic block diagram illustrating a wireless communication device that includes a host device and an associated radio in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74.

The baseband processing module 100 includes a logic link control (LLC) sub-layer 101, a medium access control (MAC) sub-layer 103, and a physical (PHY) layer 105. The LLC layer 101 generally complements the MAC layer 103 and provides a common access control standard and governs the assembly of data payloads and the exchange of the data payloads between data stations independent of the transmission technique that is used. The MAC sub-layer 103 provides a delivery mechanism for user data over the wireless media. The PHY layer 105 provides services and functions that include establishment and termination of a connection to a communications medium, contention resolutions and flow control for data, modulation or conversion between the representation of digital data in user equipment, such as host devices 18-32, and corresponding signals transmitted over a communications channel. It should be noted that the LLC sub-layer 101 and the MAC sub-layer 103 may be implemented by one or more processing devices.

The baseband processing module 100, in combination with operational instructions stored in memory 75, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 25 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of ordinary skill in the art will appreciate, the wireless communication device of FIG. 3 may be implemented using one or more integrated circuits. For example, the host device may be implemented on a first integrated circuit, the baseband processing module 100 and memory 75 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
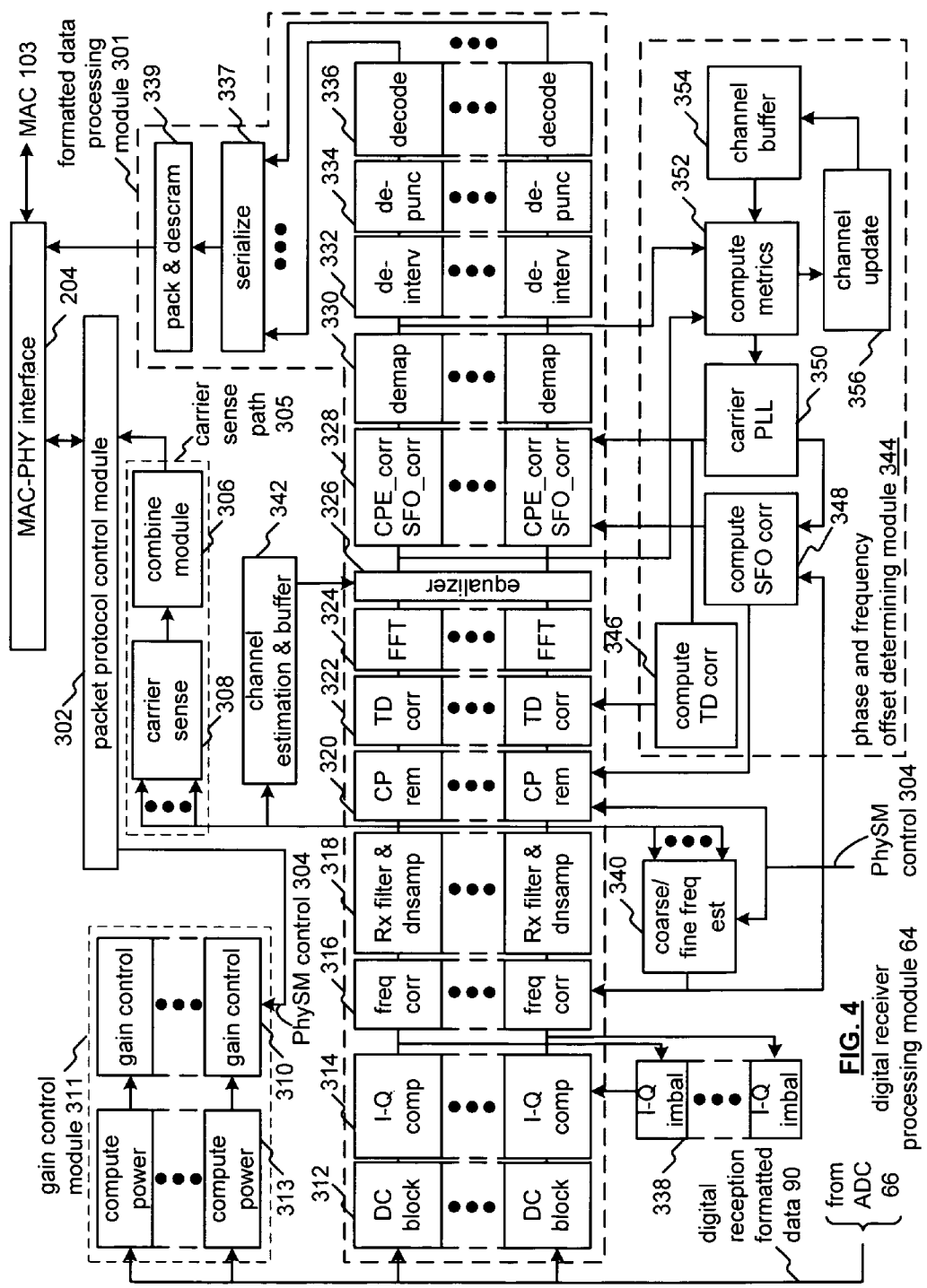
FIG. 4 is a block diagram illustrating a digital receiver processing module in accordance with the present invention.

FIG. 4 is a block diagram illustrating a digital receiver processing module 64. The digital receiver processing module 64 has a formatted data processing module 301, a phase and frequency offset determining module 344, a coarse/fine frequency estimate 340, an I-Q imbalance estimation module 338, a gain control module 311, a carrier sense path 305, a packet protocol control module 302, and a MAC-PHY interface 204.

In general, if a single input, single out (SISO) is received, then a single channel is used with respect to the digital receiver processing module 64. But if multiple transmissions, such as multiple-input, multiple-output (MIMO), is provided through the receive signal, then the combination of propagation of distortion is in the signals (for example, with two transmit antennas and two receive antennas in the transmission scheme then there are four possible combinations of channels). Accordingly, on each receive channel there will be a channel for every different transmission with respect to the configuration used.

In operation, the MAC-PHY interface 204 operation interfaces the digital receiver processing module 64 with a MAC 103 (see FIG. 3), which is a sub-layer that provides a delivery mechanism for user data over the wireless media. The MAC-PHY interface 204 interfaces with the packet protocol control module 302.

The packet protocol control module 302 interprets the received information from the combining module to determine the particular mode for the formatted data processing module 301 that corresponds to a received frame. The packet protocol control module provides a physical state machine (PhySM) control 304 that includes control signals such as for compensation control, channel estimation, gain control, and mode based on the digital reception formatted data (see FIG. 2). The packet protocol control module 302 also generates a mode indication to the MAC/PHY interface 386 for providing the recovered information to the MAC layer of the wireless communication device. The packet protocol control module 302 provides a physical state machine control 304 to the gain control module 311. The compute power 313 determines the amount of power necessary to detect the inbound RF signal 88 which is then provided to the gain control. The gain control 310 then generates adjustments to maintain the inbound RF signal 88 within parameters sufficient for processing by the digital receiver processing module 64.

The compute power module 313 receives the digital reception formatted data 90 and computes the power of each of the data streams 90 using one of a variety of techniques. For example, one power measurement technique is to compute the received signal strength based on the magnitude of the in-phase component and the magnitude of the quadrature component. The gain control modules 390, 392 interpret the corresponding power to establish the gain for an automatic gain control loop of the plurality of receiver sections 118-122 of FIG. 3.

With respect to gain control, for example, standard specification IEEE 802.11a calls for a maximum receive signal size of −30 dBm and a minimum sensitivity of −82 dBm. In general, one objective is to maximize signal size at ADC 66, while providing headroom for adjacent channel interference and the peak-to-average ratio of OFDM symbols.

The formatted data processing module 301 has a DC block filter 312, an I-Q compensation module 314, a frequency correction module 316, a receive-filter-and-down-sample module 318, a cyclic prefix removal module 320, a time domain correction module 322, a domain conversion module 324, provided by a fast Fourier transform module, an equalizer module 326, a common phase error correction and sampling frequency offset correction module 328, a demapper module 330, a de-interleaver module 332, a de-puncture module 334, a decoder module 336, a serializer module 337, and a pack-and-descramble module 339.

In operation, the formatted data processing module 301 receives digital reception formatted data 90 from the ADC 66 (see FIG. 3). The digital reception formatted data 90 is provided to the DC block filter 312, which blocks extraneous low-frequency signals from the digital reception formatted data 90. The DC block filter 312 data is then provided to the I-Q compensation module 314, which is then provided to the frequency correction 316, compensates for frequency differences that may have occurred, for example, during the wireless transmission, to produce frequency compensated symbols.

Monitoring the output of the I-Q compensation module 314 is the I-Q imbalance estimation module 338, shown as having multiple paths, that is operably coupled to determine an IQ imbalance within each of the received paths of the digital reception formatted data 90. The IQ imbalance estimation module 338 monitors the outputs of the IQ compensation module 314 and determines the corresponding IQ imbalance there from. The IQ imbalance may be determined in a variety of ways including the ones disclosed in co-pending patent application RECEIVER IQ IMBALANCE CALIBRATION, U.S. patent application Ser. No. 11/434,379, which is hereby incorporated herein by reference.

From the frequency correction 316, the output is provided to the receive-filter-and-down-sample module 318. The receive-filter-and-down-sample module 318 filters frequency compensated symbols to produce compensated symbols. In operation, the filter-and-down sample module 318 determines or filters the signal-type received by the data receiver processing module 64. For example, whether the nature of the signal-type is an upper band signal, a lower band signal or signal spreading across the spectrum. The output of the receive-filter-and-down sample module 318 is provided to carrier sense path 305, which determines the signal type that is represented through the digital reception formatted data 90.

The carrier sense module 308 of the carrier sense path 305 monitors each of the streams of compensated symbols provided by the receive-filter-and-down sample module 318 to detect the presence of a valid signal. The carrier sense path 305, having carrier sense 308 and combine module 306, provides a carrier sense indication to the MAC sub-layer 103 for the verification of activity with respect to the receiver. Carrier sense is typically done in the first stages of a frame preamble. Thus, the carrier sense module 308 is monitoring the received signals to determine whether the received signals correspond to preambles of a frame of a particular wireless communication protocol. The combining module 306 combines the outputs of the carrier sense module 308, which is provided to the packet protocol control module 302.

The packet protocol control module 302 interprets the received information from the combining module 306 to determine the particular mode, conveyed by the physical state machine control 304, which corresponds to the received frame. For example, the received frame may be in accordance with one of a plurality of wireless protocol formats including, but not limited to IEEE 802.11a, b, g, n, et cetera. From this information, the packet protocol control module 302 generates the mode conveyed by the physical state machine control 304 such that the digital receiver processing module 64 may appropriately process inbound digital reception formatted data 124 (see FIG. 3).

Also, the output of the receive filter and down sample 318 is provided to the coarse/fine frequency estimate 340 as a form of feedback into the frequency correction 316. The coarse/fine frequency estimation module 340, based on information provided by the packet protocol control module 302 via the physical state machine control signal 304, monitors the compensated symbol output at the receive filter and down sample module 318 to determine frequency differences between the received signal and the clocking circuitry of the digital receiver processing module 64.

The information provided by the packet protocol control module 302 via the physical state machine control signal 304 corresponds to the desired packet format for example, OFDM packet format and the channel bandwidth, and the number of tones-per-channel. For example, the channel bandwidth may be 20 MHz having 64 OFDM tones-per-channel. Alternatively, the channel bandwidth may be 40 MHz and the channel may have 128 tones-per-channel. As another example, the transmitted signal may be provided with a carrier frequency of 5220 MHz. At the receiver, the carrier frequency may be at 5220.05 MHz and perhaps, in some instances, to further the example, 5220.19 MHz. Accordingly, the coarse/fine frequency estimation module 340 determines the frequency difference and provides a correction signal to frequency correction module 316.

The cyclic prefix (CP) removal module 320 removes cyclic prefix between symbols provided in the digital reception formatted data 90. A cyclic prefix serves to mitigate inter-symbol interference (ISI) and inter-frequency interference (IFI) during transmission of the encoded signal.

The output of the CP removal module 320 is received by the time domain (TD) correction module 322 serves to provide further correction introduced by variance in the transmission of the signal. The output of the TD correction module 322 is provided to the FFT module 324, which converts the time domain correction output to a frequency domain (FD) output, which is provided to the equalizer module 326.

The equalizer module 326, in accordance with the channel estimation-and-buffer 342, equalizes the frequency domain symbols output from the FFT module 324 to produce equalized frequency domain (FD) symbols. The equalizer module 326 serves to mitigation of inter-symbol interference created. Such equalization may be done in accordance with the teachings of a co-pending patent application MAXIMUM LIKELIHOOD DETECTION FOR MIMO RECEIVERS, U.S. patent application Ser. No. 11/525,270, now issued as U.S. Pat. No. 7,542,743, on Jun. 2, 2009, which is hereby incorporated by reference herein.

The channel estimation module 342 monitors the compensated symbol output of the receive-filter-and-down-sample module 318 to determine a corresponding channel response that is stored in a buffer. The functionality of the channel estimation module 382 and equalizing module 310 may be further described in co-pending patent application Ser. No. 11/434,379 RECEIVER IQ IMBALANCE CALIBRATION, which is hereby incorporated herein by reference.

The equalized FD symbol output of the equalizer module 326 is provided to the (CPE) correction and sampling frequency offset (SFO) correction module 328 to adjust for analog impairments and channel variations imposed upon the signal as it is being transmitted. Adjustment data is provided to the CPE and SFO correction module 328 from the phase and frequency offset determining module 344.

The phase and frequency offset determining module 344 has a compute time domain correction 346, a compute SFO correction 348, a carrier PLL 350, a compute metrics 352, a channel buffer 354, and a channel update 356.

The compute SFO correction module 348, within the phase and frequency offset determining module 344, monitors the carrier PLL 350 based on the coarse/fine frequency estimation module 340 output to produce the correction signal for the SFO. In general, the correction signal reflects adjustment when the analog-to-digital conversion process is not in "lock step" with the clock of the transmitter. The common phase error (CPE) occurs as a result of phase rotation of the symbols, phase noise and/or carrier frequency offset. The compute metrics 352, based on information of the channel update 356 and channel buffer 354, provide the corresponding correction signals.

The compute metrics 352 determines various error metrics, for example, linear error, where the Euclidian (distance) metric wherein the signals are off by a certain amount, and phase errors, also known as rotational errors. The compute metrics 352 provides a feedback loop function based on the output of the equalizer module 326 and the output of the demapper 330. Through this feedback loop, the compute metrics 352 provides a current symbol correction wherein the errors are removed via the output of the compute metrics 352 to the carrier PLL 350, which determines the amount of correction within the CPE correction and SFO correction 328, the timing domain correction via the computer time domain correction 346 and the compute SFO correction 348. In operation, multiple correction passes are provided to the signal between the CPE and SFO correction module 328 and the demapper 330 to better increase the performance or refinements for processing of the received frame.

The channel update receives the output of the compute metrics 352 to change or adjust the reference point to the receiver channel to compensate for propagation distortion with respect to the expected or proper constellation grid. The output of the channel update 356 is provided to the channel buffer 354, which provides further information to the compute metrics 352 for determination of the error metrics.

The symbol demapper 330, in accordance with the particular mode and mapping scheme as determined by the packet protocol module 302, demap the symbols to produce the interleaved data to the de-interleaver 332.

The deinterleaver 332, with paths activated with respect to the particular mode as set out by the packet protocol control module 302, receives the interleaved data 344, 346 and deinterleaves the corresponding data. The de-interleaver 332 serves to de-interleave the output of the demapper 330 wherein, at the transmitter, the bits are permeated in such a manner that adjacent bits are separated by several bits after interleaving. The output of the de-interleaver 332 is provided to the de-puncture 334, wherein at the transmitter the data stream is punctured according to the data rate requirement of the applicable standards specification and fragmented into blocks having length determined by the transmit data rate.

The depuncture module 334, receives the deinterleaved data, which is depunctured in accordance with the mode and puncturing convention employed by the transmitter. The particular puncturing scheme is determined by the packet protocol control module 302. The decoder 336 decodes the depunctured data to produce decoded data. The serializing module 440 serializes the decoded data and provides it to the packet and descramble module 442. The packet and descramble module 442 packetizes and descrambles the data to produce the inbound data 92 conveyed via the MAC-PHY interface 204 (see FIG. 3).

Figure 5:
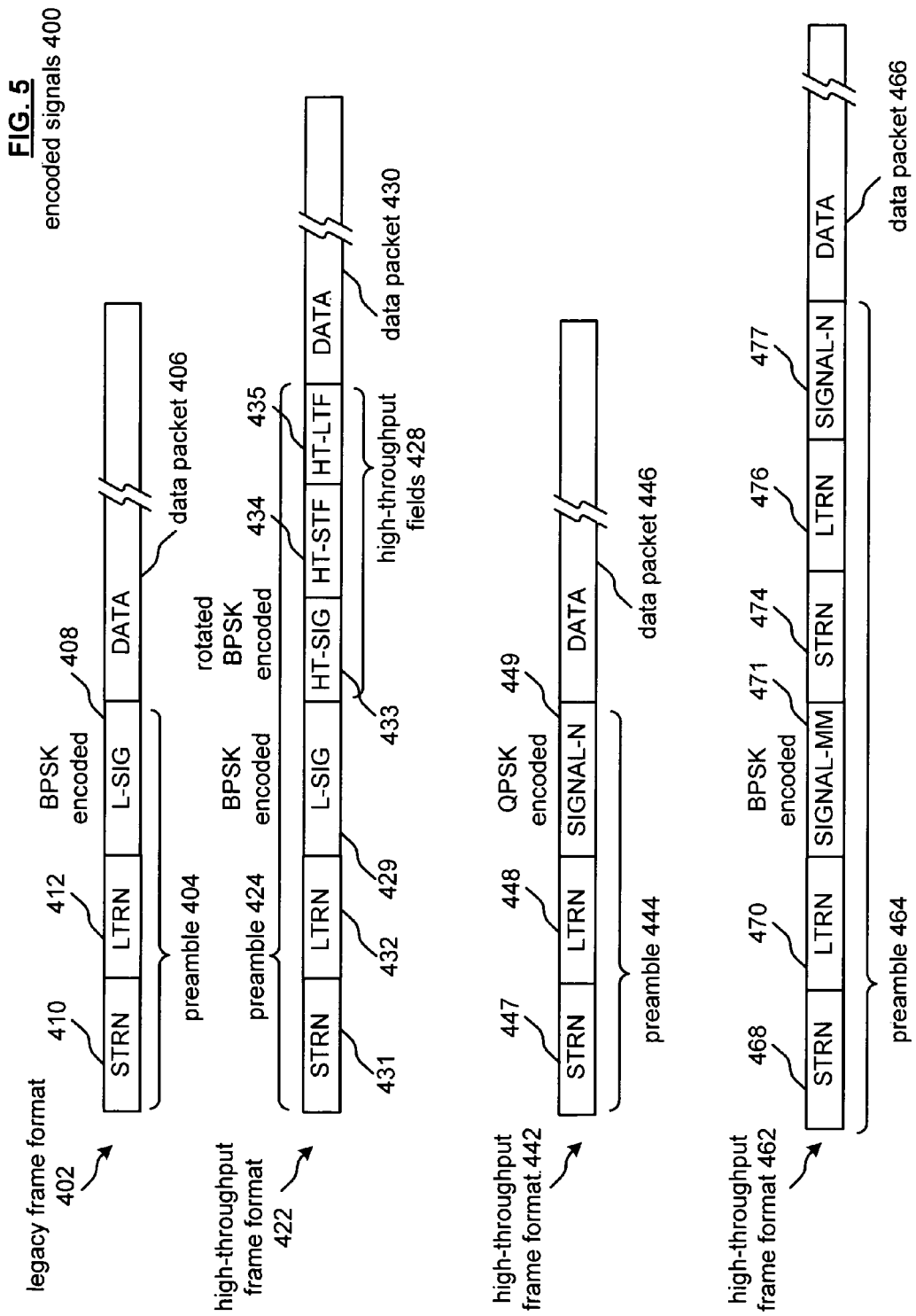
FIG. 5 illustrates various frame formats that may be used for encoded signals in accordance with the present invention.

FIG. 5 is an illustration of various framing formats that may be used for encoded signals 400. The framing formats shown are a legacy frame format 402, a high-throughput frame format 422, a high-throughput frame format 442, and a high-throughput frame format 462. The legacy frame format 402 has a preamble 404 and a data packet 406. The preamble 404 has a short training field 410, a long training field 412, and a legacy signal field 408. As shown by way of example, the legacy signal field 408 is BPSK encoded.

The high-throughput frame format 422 has a preamble 424, which includes a high-throughput field portion 428 and a data packet 430. The preamble 424 has a short training field 431, a long training field 432, and a legacy signal field 429 that is BPSK encoded. The high-throughput portion 428 includes a high-throughput signal field 433 that is rotated-BPSK encoded, a high-throughput short training field 434, and a high-throughput long training field 435.

The high-throughput frame format 442 has a preamble 444 and a data packet 446. The preamble 444 has a short training field 447, a long training field 448, and a signal field SIGNAL-N 449. As shown by way of example, the signal field SIGNAL-N 449 is QPSK encoded.

The high-throughput frame format 462 has a preamble 464 and a data packet 466. The preamble 464 has a short training field 468, a long training field 470, a signal field SIGNAL-MM 471, a short training field 474, a long training field 476, and a SIGNAL-N field 477. As shown, by way of example, the signal field SIGNAL-MM 471 is BPSK encoded.

The variety of frame formats of FIG. 5 illustrate structures used to increase throughput of data with respect to wireless LAN systems while sustaining backwards compatibility, interoperability with existing systems. Though embedded systems may be accommodated with lower data rates, increased throughput is generally demanded by anticipated devices, such as portable multi-media to license, standards definition television, high-definition television, and consumer electronics, dense hotspots or enterprised upon them for multiple units per access points, and user network capacity at a premium for mixing the data, including voice-over-Internet protocol and streaming video. For example, data rates beyond 54 Mbit/s and in excess of 100 Mbit/s would be used for such high-throughput devices.

In general, frame formats have a preamble that is used to synchronize the incoming signal with the receiver, such as those illustrated in FIG. 4 with respect to a digital receiver processing module 64. In general, each of the frame formats has a short training field and a long training field. The short training field is used to train the automatic gain control and to obtain a coarse estimate for a channel. The long training fields are used to fine tune channel estimates. The ADC and coarse channel estimates and the long training fields are used to fine tune channel offsets. The signal fields contain information about the rate and length of the data packet 466.

The data fields 406, 430, 446 and 466, are of a configuration specified by the applicable standard specification. The examples provided of the legacy frame format 402 and the high-throughput frame format 422, the preamble 404 and the preamble 424, respectively, provide use of a short preamble. With respect to the legacy frame 402, as an example, the short preamble structure typically has a short training field 410 and a long training field 412, and a signal field 408. In this manner, with respect to the high-throughput frame format 422, the high-throughput fields 428 are appended to the short preamble to provide high-throughput capability with respect to the transmission and received data provided via the data packet 430.

Furthermore, with respect to the high-throughput frame format 442 and 462, short preambles are deployed, such as short training field 447 and long training field 448 for the high-throughput frame format 442, and the short training field 468 and the long training field 470 for the high-throughput frame format 462. Further processing modifications made as a result with respect to the signal fields, as shown with the signal field 449 via a SIGNAL-N field and a SIGNAL-MM 471, which are followed by further training fields, as shown in 462 or perhaps the data packet 446.

In general, these frame formats illustrate use of the packet protocol control module 302 that is capable of interpreting the received information from the frame format to provide an operational mode that corresponds to the frame. Accordingly, processing flexibility is provided through the packet protocol control module 302 to accommodate deviations or variations with respect to the frame formats that may be deployed during processing with respect to the digital receiver processing module 64. For example, an updatable table may be used to contain frame format structures representative of those that would be used for high-throughput data rates, as well as being receptive to updates to accommodate those being developed.

Figure 6:
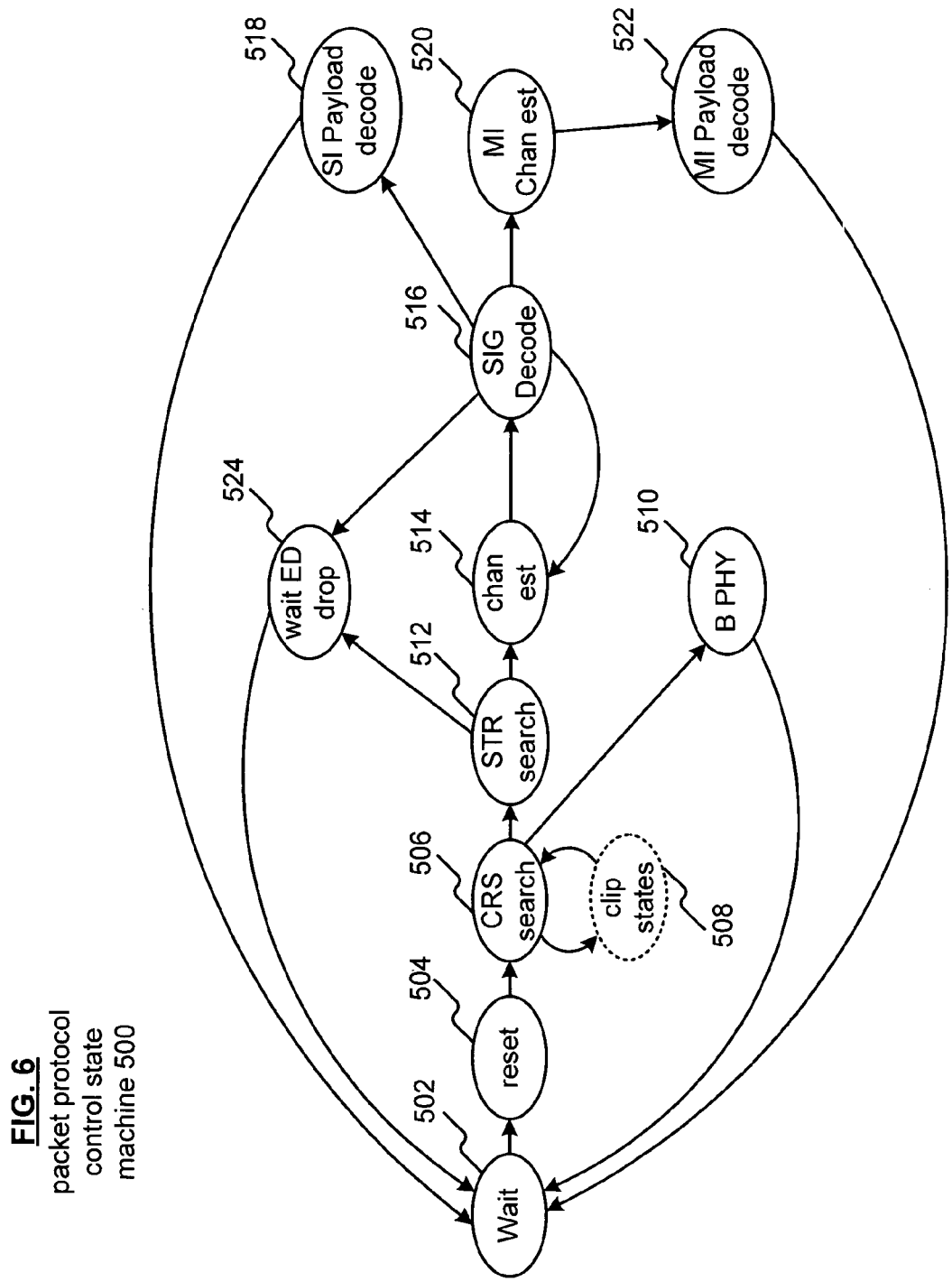
FIG. 6 is a block diagram of a packet protocol control module state machine in accordance with the present invention.

FIG. 6 is a block diagram of a packet protocol control module state machine 500 for the packet protocol control module 302. The packet protocol control module 302 interprets the received information from the combining module 306 and the MAC-PHY interface to determine the mode corresponding to the received frame.

For example, the received frame may be in accordance with one of a plurality of wireless protocol formats including, but not limited to IEEE 802.11a, b, g, n, et cetera. From this information, the packet protocol control module 302 generates the mode 342 such that the digital receiver processing module 64 (see FIG. 4) may appropriately process the digital reception formatted data 90.

The packet protocol control module state machine may be contained within a memory 75 (see FIGS. 2 and 3), which is executable by the baseband processing module or otherwise cause the baseband processing module to execute the steps provided.

In general, the packet protocol control module state machine 500 provides for detect and reception of a frame based on a portion of a preamble of the frame, wherein the frame includes preamble on a data payload. Upon detect and reception, determining a frame type of the received frame from one of many frame types, wherein the determining is based upon at least a portion of the preamble. Upon determining a frame type, then processing of the remaining portion of the preamble in accordance with the frame type it is determined the payload processing parameters associated with that payload. Upon determination of the payload processing parameters then processing the data payload based upon those processing parameters.

As shown, the packet protocol control module state machine 500 has a wait state 502, a reset state 504, and a carrier signal search 506. Also shown is a symbol timing recovery search 512, a channel estimation state 514, a signal decode state 516, and a single input payload decode 518, a multiple input channel estimation state 520, a multiple input payload decode 522, and a wait energy drop 524. An IEEE 802.11b physical layer state 510 is provided to accommodate backwards compatibility with such devices.

Accordingly, the state machine 500 begins at the wait state 502. Upon receiving a signal, a reset state 504 is entered in which mode assumptions are made for the received signal—that is, either being in a mixed-mode frame format or a frame format without a priori knowledge as to the frame structure. For example, the high-throughput frame format 462 would be considered as a mixed-mode format, the high-throughput frame format 442 may be considered of an a posteriori format, in which the structure is to be discerned because the format type is not self-evident or capable of being determined without examination of the received signal.

At the carrier signal search state 506, the carrier signal is detected with respect to a received encoded signal for a received frame determines a portion of the preamble of the frame. When clipping results from the analog-to-digital conversion providing the data signal (such as by the analog-to-digital converter 66 of FIG. 2), the state diagram leaves the carrier signal search state 506 and enters the clip state 508. After a predetermined time period expires, the carrier signal search state 506 is entered once again.

When the CRS search state 506 and the frame type corresponds to an IEEE 802.11b frame type, the B physical (B PHY) state 510 is entered. In the B PHY state 510, processing of the remaining portions of the preamble includes interpreting a start of frame delineation field to identify a start of the frame, interpreting a signal field to determined a type of modulation for processing the data payload associated with that received frame, and interpreting a length field to determine the length of the data payload. The processing the data payload for the received frame 400 in the B physical state 510, includes determining a start of the data payload based upon the start of the frame of the received frame, and for the length of the data payload, demodulating the data payload based upon the type of the modulation provided.

When the frame type at the CRS search state 506 does not indicate that the received frame corresponds to an IEEE 802.11b frame type, the a symbol timing recovery (STR) search state 512 is entered, where the frame type of the received frame is determined from at least a portion of the preamble of the received frame. From the STR search state 512, a determination of the long training symbol or the short training symbol of at least a portion of the frame preamble is made. When an error occurs (for example, where there is insufficient information or data within a received frame), then a wait energy drop (ED) state 524 is entered. That is, when the received frame is not susceptible to being interpreted, then at the wait ED state 524, the state diagram waits for the energy state of the received signal substantially diminishes before returning to the wait state 502.

Continuing along the state machine path having states 502, 504, 506, 512, 514 and 516, the channel estimate state 514 is entered, for determining the frame type of the received frame from at least a portion of the received frame preamble. Upon channel estimate state 514, the signal (SIG) decode state 516 is entered. At the SIG decode state 516, the determination is made as to the received frame type with respect to a variety of frame types, such as those illustrated in FIG. 5. Generally, the encoding type, provided as a modulation form, of the signal field for the received frame type is determined. The encoding type may be determined in a variety of ways including the ones disclosed in co-pending patent application METHOD & APPARATUS FOR MODULATION TYPE DISCRIMINATION , U.S. patent application Ser. No. 11/406,667, now issued as U.S. Pat. No. 7,738,604, on Jun. 15, 2010, which is hereby incorporated herein by reference.

As an example of use of the modulation type of a signal field, when the received frame is an a posteriori frame type, the modulation type for the signal field of the preamble is indicative of whether the frame type is an extant frame type, which may be for an IEEE 802.11a frame type, an IEEE 802.11g frame type, et cetera, or a non-extant frame type having a structure supporting high-throughput capability or other increased data transmission rate format.

Referring briefly back to FIG. 5, various encoding types are illustrated with respect to BPSK encoded for a signal field 408, rotated BPSK encoded for a signal field 429, QPSK encoded for a signal field 449, and BPSK encoded for a field 471. For this example, the frame formats are provided as two classes: a first class having characteristics of extant frames (that is, mixed-mode), such as a short preamble, and a second class being non-extant class that relies on a posteriori determination of the frame type. As should be readily appreciated by those of ordinary skill, the classification of frame types can be adjusted or modified to one or many, and that such classification designations may be conducted through the MAC sub-layer 103.

For a first class of frame types, the frame formats 402 and 422 provide an example of an extant format and a mixed-mode format, respectively, having a short preamble as a portion of the frame. For a second class of frame types, the frame formats 442 and 462 provide an example of non-extant frame types that are subject to a posteriori determination.

With the first class type, the frame formats have a legacy signal field 408 and 429, respectively; however, the frame format 422 has appended high-throughput fields 428. The portions of the frames following the short preamble are discriminated to determine the modulation type of the appropriate signal field. For this example, a portion of the data packet 406 is discriminated for the encoding type, and the HT-SIG field 433 is discriminated for encoding type, which is rotated-BPSK.

With the second class type, the frame formats 442 and 462 have a signal field SIGNAL-N 449 and a signal field SIGNAL-MM 471, respectively. The signal field 449 is QPSK encoded, and the signal field 417 is BPSK encoded. Because of the non-extant classification, the determination of the encoding convention for the signal fields is made at a differing portion of the preambles from the first class, which uses a short preamble. Furthermore, upon determining the encoding convention of the signal fields for the frame formats, the contents of the signal field may be interpreted to assess whether the non-extant frame format provides for high-throughput data rates. For example, the frame format 462 shows an extant encoding convention by having a BPSK encoded signal field 471; however, a reserved bit within the signal field may be used as a flag to indicate that the frame format 462 is a high-throughput frame type.

Returning to FIG. 6, when, at the SIG decode state 516, the modulation type of the signal field for the received frame deploys a high-throughput modulation type (for example, QPSK), the state machine processing returns to the channel estimate state 514 and is further refined to indicate the high-throughput status of the received frame, fine channel estimate processes are implemented, and the physical or baseband receiver, such as that shown in FIG. 4, is configured for high-throughput operation via the physical state machine control 304.

Otherwise, at the SIG decode state 516, when the modulation type of the signal field for the received frame does not indicate a high-throughput modulation type (for example, BPSK), then the single-input (SI) payload decode state 518 is entered, and the physical, or baseband, receiver is configured for extant processing of the data payload. At the SI payload decode state 518, a determination of the payload processing parameters for the data payload of the frame includes interpreting a rate field to determine a data rate, a modulation protocol, and a coding rate of the single input data payload and then interpreting a length field to determine length of the single input data payload. Following the processing, the state machine returns to the wait state 502.

At the SIG decode state 516, with a determination of the encoding convention of a frame signal field as being a high-throughput data frame type, the multiple input (MI) channel estimate state 520 is entered, wherein the contents of the preamble are processed to provide a channel estimate. Then at the MI payload decode state 522, processing is performed to determine the payload processing parameters for each of the multiple input data payloads. The processing includes interpreting a rate field to determine a data rate, a modulation protocol, and a coding rate for each of the multiple input data payloads, and interpreting a length field to determine a length for each of the multiple input data payloads. With the payload processing parameters, the data payload is processed accordingly. Following the processing for the MI payload decode state 522, the state machine returns to the wait state 502.

Figure 7:
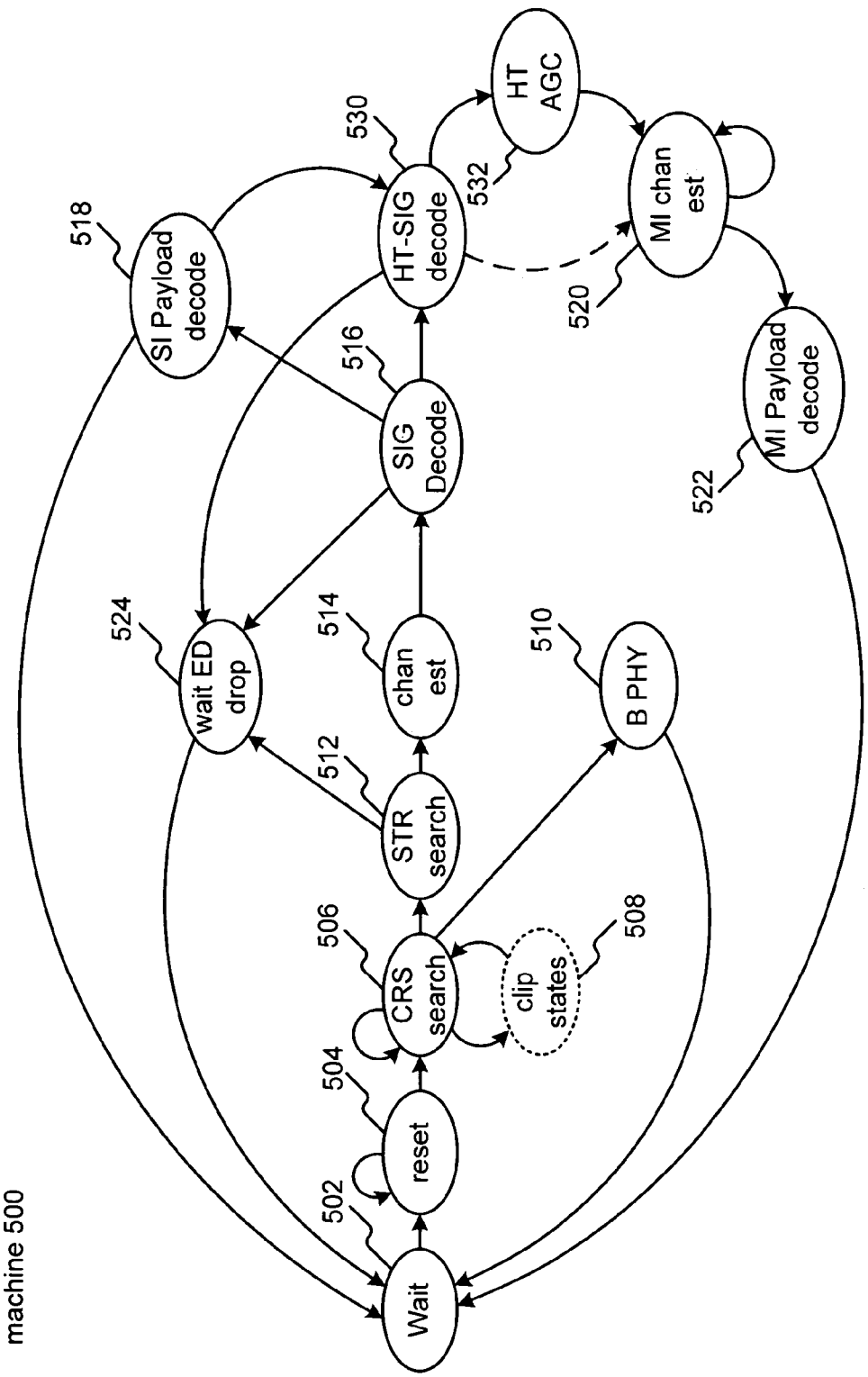
FIG. 7 illustrates a packet protocol control module state machine accommodating non-extant frame formats in accordance with the present invention.

FIG. 7 illustrates a packet protocol control module state machine 500 that shows processing for non-extant frame types. As shown, the packet protocol control module state machine 500 is comprised of additional states, including high-throughput-signal decode state 530 and high-throughput automatic gain control state 532.

The additional states correspond to the frame format of the received frame, such as that of the high-throughput frame format 462. The frame format can be discerned through a posteriori processing, or by assessing the frame format through an updatable lookup table containing a set of known or expected frame types having respective field sequences for long symbol training, short symbol training, signal fields, et cetera, that can be accessed by the pattern and characteristics of a received frame format. Other forms of processing may be used to assess the format of a received frame.

Referring to the high-throughput frame format 462 (see FIG. 5), the determination of the frame type is assessed by determining the encoding convention of the signal field 471, and interpreting the signal field, which in this example, has a flag provided by a reserved bit. Accordingly, the frame field sequences can be provided through an updatable lookup table that provides the field sequences for frame formats. With the example provided by frame format 462, the field sequence is "STRN, LTRN, SIGNAL-MM, STRN, LTRN, SIGNAL-N, DATA."

In FIG. 7, at the SIG decode state 516, a determination of the frame type of the received frame is made based on at least a portion of the preamble. The frame type, such as the frame format 462 (see FIG. 5) had been determined to be a high-throughput frame type. The remaining portion of the preamble is processed in accordance with the frame type to determine the payload processing parameters. In this example, the field sequences for the received signal, which is a high-throughput frame format 462, is accessed from an updatable lookup table. Accordingly, the state machine 500 determines the encoding type of the high-throughput signal field SIGNAL-N 477.

When the symbol following the signal field is a training symbol, the MI channel estimate state 520 is entered for further processing. Otherwise, upon the decode of a high-throughput-signal field 477 of the frame in state 530, the high-throughput adjustable gain control (HT AGC) state 532 is entered, and processing parameters conveyed to the physical layer, or baseband receiver, of FIG. 4 through the physical state machine control 304.

Following the HT AGC state 532, the MI payload decode state 522 is entered in which, for each of the multiple input data payloads, a rate field is interpreted to determine a data rate, a modulation protocol, and a coding rate, and for each of the multiple input data payloads, a length field is interpreted to determine the length. Upon completion of the processing, the frame returns to the wait state 502.

As is illustrated by the state machine of FIG. 6 and FIG. 7, provisions for other frame types is accommodated, while also providing the flexibility and capability of processing additional frame types is further accommodated. Furthermore, additional frame types can be included as needed by manipulation of a table referred to by the packet protocol control module state machine 500 for further configuration and establishment of a digital receiver processing module in accordance with the principles of this invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a packet protocol control module for a multi-protocol programmable baseband receiver processing module. As one of ordinary skill in the art will appreciate, other embodiments may be derived from the teaching of the present invention without deviating from the scope of the claims.

What is claimed is:

1. A method of frame processing comprising:
   detecting reception of a frame based on a portion of a preamble of the frame, wherein the frame includes a preamble and a data payload;
   determining from the portion of the preamble of the frame whether the frame is a legacy frame type that corresponds to an 802.11b frame type;
   if the frame is not an 802.11b frame type, determining, based upon a modulation type, a frame type of a plurality of frame types from other portions of the preamble of the frame, wherein the plurality of frame types include legacy frame types which are not 802.11b frame types, and include non-legacy frame types, each non-legacy frame type having a dissimilar structure from remaining non-legacy frame types and supporting a high-throughput data capability;
   when the determined frame type of the frame is a non-legacy frame type, processing, based upon the determined frame type and structure, a signal field of the other portions of the preamble and a remaining portion of the preamble to determine payload processing parameters for the data payload; and
   processing the data payload based on the payload processing parameters.

2. The method of claim 1, wherein detecting reception of a frame comprises:
   performing carrier sense detection on the portion of the preamble of the frame.

3. The method of claim 2, wherein the portion of the preamble of the frame comprises at least one of a synchronization field and a short training sequence.

4. The method of claim 1 further comprising, when the frame type is a legacy frame type that corresponds to an IEEE 802.11b frame type, processing of the remaining portion of the preamble including:
  interpreting a start of frame delineation field to identify a start of the frame;
  interpreting a signal field to determine a type of modulation for processing the data payload; and
  interpreting a length field to determine a length of the data payload;
  the processing of the data payload including:
  determining a start of the data payload based on the start of the frame; and
  for the length of the data payload, demodulating the data payload based on the type of modulation.

5. The method of claim 1, wherein determining the frame type of the plurality of frame types from the other portions of the preamble further comprises:
  performing symbol timing recovery on a symbol training portion of the other portions of the preamble to provide symbol timing;
  performing a channel estimation based on the symbol training portion and in accordance with the symbol timing;
  determining a modulation type of the signal field; and
  interpreting the signal field and the modulation type to determine the frame type.

6. The method of claim 5, wherein interpreting the signal field further comprises at least one of:
  determining a single input data payload; and
  determining a multiple input data payload.

7. The method of claim 6, wherein the processing of the remaining portion of the preamble in accordance with the frame type to determine the payload processing parameters comprises, when the signal field indicates the single input data payload:
  interpreting a rate field to determine a data rate, a modulation protocol, and a coding rate of the single input data payload; and
  interpreting a length field to determine a length of the single input data payload.

8. The method of claim 6, wherein the processing of the remaining portion of the preamble in accordance with the frame type to determine the payload processing parameters comprises, when the signal field indicates the multiple input data payload:
  for the multiple input data payload, interpreting a rate field to determine a data rate, a modulation protocol, and a coding rate; and
  for the multiple input data payload, interpreting a length field to determine a length.

9. A baseband receiver comprising:
  a processor; and
  memory operably coupled to the processor, wherein the memory includes operational instructions that cause the processor to:
  detect reception of a frame based on a portion of a preamble of the frame, wherein the frame includes a preamble and a data payload;
  determine from the portion of the preamble of the frame whether the frame is a legacy frame type that corresponds to an 802.11b frame type;
  if the frame is not an 802.11b frame type, determine, based upon a modulation type, a frame type of a plurality of frame types from other portions of the preamble, wherein the plurality of frame types include legacy frame types which are not 802.11b frame types, and include non-legacy frame types, each non-legacy frame type having a dissimilar frame structure from remaining non-legacy frame types and supporting a high-throughput data capability;
  when the determined frame type of the frame is a non-legacy frame type, process, based upon the determined frame type and structure, a signal field of the other portions of the preamble and a remaining portion of the preamble to determine payload processing parameters for the data payload; and
  process the data payload based on the payload processing parameters.

10. The baseband receiver of claim 9, wherein the memory further comprises operational instructions that cause the processor to detect reception of the frame by:
  performing carrier sense detection on the portion of the preamble of the frame.

11. The baseband receiver of claim 10, wherein the portion of the preamble of the frame comprises at least one of a synchronization field and a short training sequence.

12. The baseband receiver of claim 9 wherein the memory further comprises operational instructions that cause the processor to process the remaining portion of the preamble, when the frame type corresponds to an IEEE 802.11b frame type, by:
  interpreting a start of frame delineation field to identify a start of the frame;
  interpreting a signal field to determine a type of modulation for processing the data payload; and
  interpreting a length field to determine a length of the data payload;
  the processing of the data payload including:
  determining a start of the data payload based on the start of the frame; and
  for the length of the data payload, demodulating the data payload based on the type of modulation.

13. The baseband receiver of claim 9, wherein the memory further comprises operational instructions that cause the processing module to determine the frame type of the plurality of frame types by:
  performing symbol timing recovery on a symbol training portion of the other portions of the preamble to provide symbol timing;
  performing a channel estimation based on the symbol training portion and in accordance with the symbol timing;
  determining a modulation type of the signal field of the other portions of the preamble; and
  interpreting the signal field and the modulation type to determine the frame type.

14. The baseband receiver of claim 13, wherein the operational instruction of interpreting the signal field further comprises at least one of:

determining a single input data payload; and
determining a multiple input data payload.

15. The baseband receiver of claim 14, wherein the operational instructions that cause the processor to process the remaining portion of the preamble based on the determined frame type to determine payload processing parameters, when the signal field indicates the single input data payload, comprise:
  interpreting a rate field to determine a data rate, a modulation protocol, and a coding rate of the single input data payload; and
  interpreting a length field to determine a length of the single input data payload.

16. The baseband receiver of claim 14, wherein the operational instructions that cause the processor to process the remaining portion of the preamble based on the determined frame type to determine payload processing parameters, when the signal field indicates the multiple input data payload, comprise:
  for the multiple input data payload, interpreting a rate field to determine a data rate, a modulation protocol, and a coding rate; and
  for the multiple input data payload, interpreting a length field to determine a length.

* * * * *